(12) United States Patent
Pedersen et al.

(10) Patent No.: US 10,466,851 B2
(45) Date of Patent: *Nov. 5, 2019

(54) CONNECTING ELECTRODES TO VOLTAGES

(71) Applicant: Atmel Corporation, Chandler, AZ (US)

(72) Inventors: Trond Jarle Pedersen, Jarle (NO);
Torgeir Fenheim, Mo I Rana (NO);
Jan Rune Herheim, Trondheim (NO);
Stefan Markus Schabel, Syrgenstein (DE)

(73) Assignee: Atmel Corporation, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,529

(22) Filed: Apr. 25, 2018

(65) Prior Publication Data

US 2019/0121462 A1 Apr. 25, 2019

Related U.S. Application Data

(63) Continuation of application No. 15/045,834, filed on Feb. 17, 2016, now Pat. No. 9,983,748.

(51) Int. Cl.
*G06F 3/041* (2006.01)
*G06F 3/044* (2006.01)
*G06F 1/3234* (2019.01)

(52) U.S. Cl.
CPC ............ *G06F 3/044* (2013.01); *G06F 1/3262* (2013.01); *G06F 3/0416* (2013.01); *G06F 2203/04107* (2013.01)

(58) Field of Classification Search
None
See application file for complete search history.

(56) References Cited

U.S. PATENT DOCUMENTS

| | | |
|---|---|---|
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |

(Continued)

FOREIGN PATENT DOCUMENTS

WO   WO 2012/129247 A2   9/2012

OTHER PUBLICATIONS

U.S. Appl. No. 61/454,936, filed Mar. 21, 2011, Myers.

(Continued)

*Primary Examiner* — Joseph R Haley
(74) *Attorney, Agent, or Firm* — Baker Botts L.L.P.

(57) ABSTRACT

In one embodiment, an apparatus includes a first electrode, one or more processors, and one or more memory units coupled to the one or more processors. The one or more memory units collectively store logic that is configured to cause the one or more processors to control connections of the first electrode by connecting the first electrode to a first reference voltage, then connecting the first electrode to a second reference voltage lower than the first reference voltage, and then connecting the first electrode to a third reference voltage lower than the first reference voltage and the second reference voltage. The second reference voltage is coupled to a capacitor.

20 Claims, 6 Drawing Sheets

(56) References Cited

U.S. PATENT DOCUMENTS

| | | |
|---|---|---|
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 8,723,824 B2 | 5/2014 | Myers |
| 2008/0309635 A1 | 12/2008 | Matsuo |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2015/0248177 A1 | 9/2015 | Maharyta |
| 2019/0102037 A1* | 4/2019 | Krah .................... G06F 3/0416 |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
T. J. Pedersen et al., U.S. Appl. No. 15/045,834, Non-final Rejection, dated Jun. 1, 2017.
T. J. Pedersen et al., U.S. Appl. No. 15/045,834, Response to Non-final Rejection, dated Sep. 1, 2017.
T. J. Pedersen et al., U.S. Appl. No. 15/045,834, Final Rejection, dated Nov. 1, 2017.
T. J. Pedersen et al., U.S. Appl. No. 15/045,834, Response to Final Rejection, dated Dec. 28, 2017.
T. J. Pedersen et al., U.S. Appl. No. 15/045,834, Notice of Allowance, dated Jan. 31, 2018.

* cited by examiner

CONNECTING ELECTRODES TO VOLTAGES

RELATED APPLICATION

This application is a continuation under 35 U.S.C. § 120 of U.S. application Ser. No. 15/045,834, filed Feb. 17, 2016 and entitled Connecting Electrodes to Voltages, incorporated herein by reference.

TECHNICAL FIELD

This disclosure generally relates to connecting electrodes to voltages.

BACKGROUND

Electrodes of electrical circuits, such as those in touch sensors or touch sensor styluses, may be connected to a pulsed voltage that alternates between a high reference voltage and a low reference voltage at a particular frequency. These electrical circuits may lose large amounts of charge as the electrode discharges during the transition from the high reference voltage to the low reference voltage.

DESCRIPTION OF EXAMPLE EMBODIMENTS

Figure 1:
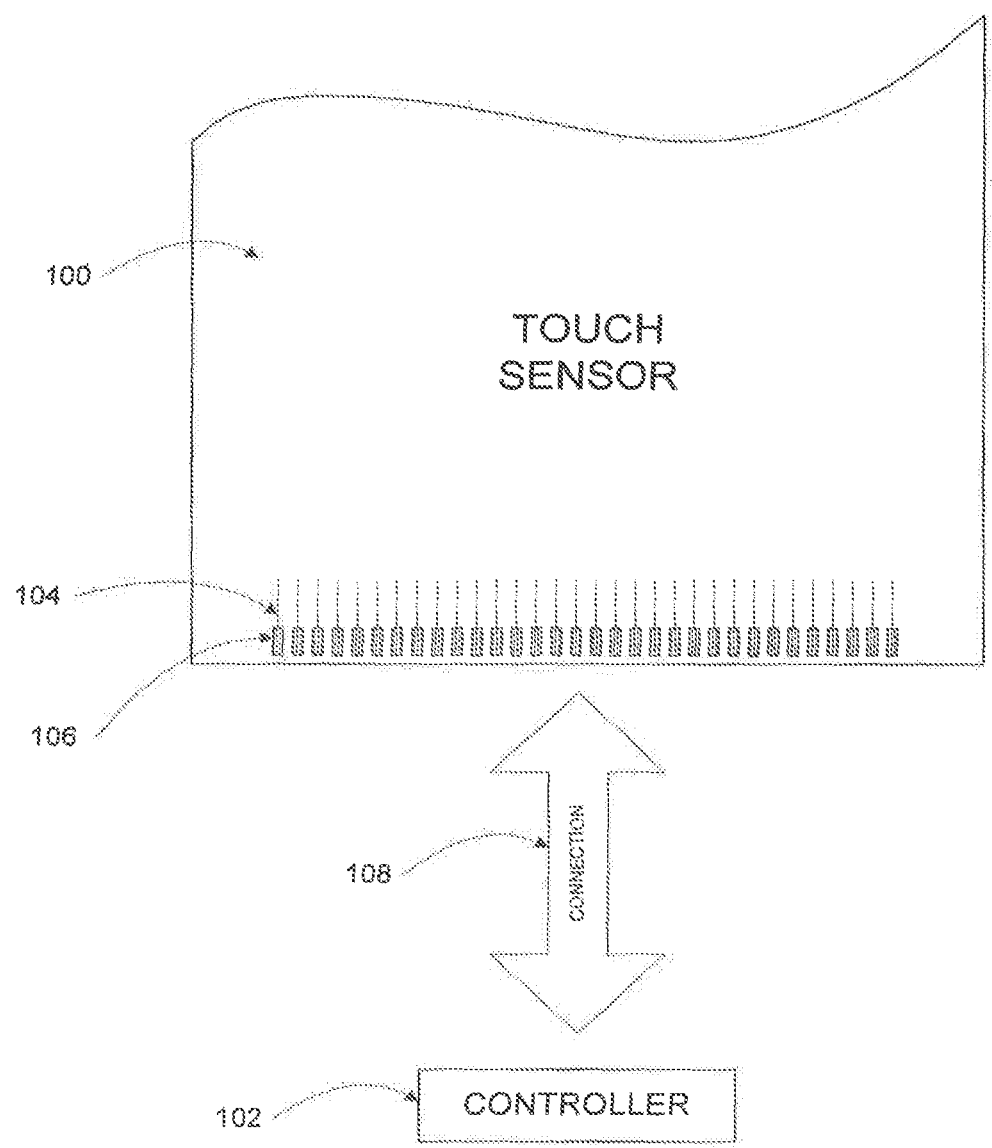
FIG. 1 illustrates an example touch sensor with an example controller according to certain embodiments of the present disclosure.

Electrodes of certain electrical circuits, such as those in touch sensors or touch sensor styluses, may be pulsed between a high reference voltage and a low reference voltage at a relatively high frequency. As the electrodes transition from the low reference voltage to the high reference voltage, the charge in the electrodes is increased. Likewise, as the electrodes transition from the high reference voltage to the low reference voltage, the charge in the electrodes is reduced. The charge during the transition from the high to the low reference voltage is typically wasted in current electrical circuits. If the difference between the high and low reference voltages is large, or if the electrodes have a large capacitance or capacitive load, then the amount of charge that is wasted may be quite large as well. Accordingly, the present disclosure describes systems and methods for charge capture and re-use for electrical circuits pulsing between high and low reference voltages. Systems and methods according to the present disclosure may allow for the reduction in the charge lost during the transition from the high reference voltage to the low reference voltage by saving the charge in a capacitor coupled to the pulsing electrical circuit. In addition, systems and methods according to the present disclosure may allow for the charge saved in the capacitor to be used in other circuits coupled to the pulsing electrical circuit, reducing overall current and power consumption in the circuits.

As used herein, electrodes may refer to any suitable electrical conductor of an electrical circuit. In one or more embodiments, for instance, electrodes may refer to sensor lines of a touch sensor. Although examples are described herein with reference to driving electrodes of a touch sensor, it will be understood that the teachings of the present disclosure may be applied to other electrical circuits, such as touch sensor styluses or other logic drive circuits (e.g., those for field effect transistors (FETs)) that include pulsing between high and low reference voltages.

During certain modes of operation of a touch sensor, many or all sensor lines of a touch sensor may be pulsed between a high reference voltage (e.g., 9 V) and ground at a high frequency (e.g., approximately 75 kHz). During self-capacitive modes of operation, a pulsed voltage may be applied to both x-axis electrodes and y-axis electrodes of a touch sensor, and the location of a touch input on the touch sensor may be determined by measuring the changes in capacitance in the capacitive nodes of the touch sensor.

In some situations, however, only a portion of the x-axis electrodes and y-axis electrodes may be driven and measured for touch input (e.g., due to limited controller resources or to conserve controller resources). In such situations, a scan of the electrodes may be performed. This may occur in three cycles (i.e., only one third of the sensor lines are being measured at a time), for example, where y-axis electrodes are measured first, odd x-axis electrodes are measured second, and even x-axis electrodes are measured third. If the non-measured electrodes are left floating in these situations (i.e., with no applied drive signal or voltage), interactions may take place between measured and non-measured electrodes due to the mutual capacitance present between the respective electrodes. A driven shield signal may therefore be applied to the non-measured electrodes, which may cancel one or more effects caused by the mutual capacitance present between measured and non-measured electrodes. The driven shield signal may be a substantially similar or identical waveform to the drive signal applied to the measured x-axis and y-axis electrodes of the touch sensor.

Because the driven shield signal may be substantially similar to the pulsed voltage signal applied to the measured electrodes (e.g., a voltage pulsing between 9 V and ground at a high frequency), a large amount of current and thus a lot of power is wasted. This is especially true in current touch sensor designs with high capacitive loads (e.g., between 15 nF and 25 nF). Therefore, rather than connecting the non-measured electrodes to ground during such pulsing, embodiments of the present disclosure may connect the non-measured electrodes to a low reference voltage (e.g., 1.33 V) coupled to a capacitor for a short period of time prior to connecting the electrodes to ground. By doing this, the capacitor may store much of the charge that would have otherwise been discharged to ground. After the capacitor has collected much of the charge, the non-measured electrode may then be connected to ground in order to mimic the pulsed signal of the measured electrodes (since the measured electrodes are connected to ground).

In one embodiment, for example, a touch-sensitive device includes a touch sensor and a controller coupled thereto. The touch sensor includes a plurality of electrodes arranged to form an array of capacitive sensing nodes. The controller includes logic that is configured, when executed, to connect each of the plurality of electrodes to a first reference voltage and then connect a first portion of the plurality of electrodes to a second reference voltage lower than the first reference voltage. The logic is further configured, while the first portion of the plurality of electrodes is connected to the second reference voltage, to connect a second portion of the plurality of electrodes to a capacitor coupled to a third reference voltage lower than the first reference voltage and higher than the second reference voltage, and to then connect the second portion of the plurality of electrodes to the second reference voltage.

To facilitate a better understanding of the present disclosure, the following examples of certain embodiments are given. In no way should the following examples be read to limit, or define, the scope of the disclosure. Embodiments of the present disclosure and its advantages may be best understood by referring to FIGS. 1-5, where like numbers are used to indicate like and corresponding parts FIG. 1 illustrates an example touch sensor array with an example touch sensor controller according to certain embodiments of the present disclosure. Touch sensor array 100 and touch sensor controller 102 detect the presence and position of a touch or the proximity of an object within a touch-sensitive area of touch sensor array 100. Reference to a touch sensor array may encompass both touch sensor array 100 and its touch sensor controller. Similarly, reference to a touch sensor controller may encompass both touch sensor controller 102 and its touch sensor array. Touch sensor array 100 includes one or more touch-sensitive areas. In certain embodiments, touch sensor array 100 includes an array of electrodes disposed on one or more substrates, which may be made of a dielectric material. Reference to a touch sensor array may encompass both the electrodes of touch sensor array 100 and the substrate(s) on which they are disposed. Alternatively, reference to a touch sensor array may encompass the electrodes of touch sensor array 100, but not the substrate(s) on which they are disposed.

In certain embodiments, an electrode is an area of conductive material forming a shape, such as for example a disc, square, rectangle, thin line, other shape, or a combination of these shapes. One or more cuts in one or more layers of conductive material may (at least in part) create the shape of an electrode, and the area of the shape may (at least in part) be bounded by those cuts. In certain embodiments, the conductive material of an electrode occupies approximately 100% of the area of its shape. For example, an electrode may be made of indium tin oxide (ITO) and the ITO of the electrode may occupy approximately 100% of the area of its shape (sometimes referred to as 100% fill). In certain embodiments, the conductive material of an electrode occupies less than 100% of the area of its shape. For example, an electrode may be made of fine lines of metal or other conductive material (FLM), such as for example copper, silver, or a copper- or silver-based material, and the fine lines of conductive material may occupy approximately 5% of the area of its shape in a hatched, mesh, or other pattern. Reference to FLM encompasses such material. Although this disclosure describes or illustrates particular electrodes made of particular conductive material forming particular shapes with particular fill percentages having particular patterns, this disclosure contemplates electrodes made of any appropriate conductive material forming any appropriate shapes with any appropriate fill percentages having any suitable patterns.

The shapes of the electrodes (or other elements) of a touch sensor array 100 constitute, in whole or in part, one or more macro-features of touch sensor array 100. One or more characteristics of the implementation of those shapes (such as, for example, the conductive materials, fills, or patterns within the shapes) constitute in whole or in part one or more micro-features of touch sensor array 100. One or more macro-features of a touch sensor array 100 may determine one or more characteristics of its functionality, and one or more micro-features of touch sensor array 100 may determine one or more optical features of touch sensor array 100, such as transmittance, refraction, or reflection.

Although this disclosure describes a number of example electrodes, the present disclosure is not limited to these example electrodes and other electrodes may be implemented. Additionally, although this disclosure describes a number of example embodiments that include particular configurations of particular electrodes forming particular nodes, the present disclosure is not limited to these example embodiments and other configurations may be implemented. In certain embodiments, a number of electrodes are disposed on the same or different surfaces of the same substrate. Additionally or alternatively, different electrodes may be disposed on different substrates. Although this disclosure describes a number of example embodiments that include particular electrodes arranged in specific, example patterns, the present disclosure is not limited to these example patterns and other electrode patterns may be implemented.

A mechanical stack contains the substrate (or multiple substrates) and the conductive material forming the electrodes of touch sensor array 100. For example, the mechanical stack may include a first layer of optically clear adhesive (OCA) beneath a cover panel. The cover panel may be clear and made of a resilient material suitable for repeated touching, such as for example glass, polycarbonate, or poly (methyl methacrylate) (PMMA). This disclosure contemplates any suitable cover panel made of any suitable material. The first layer of OCA may be disposed between the cover panel and the substrate with the conductive material forming the electrodes. The mechanical stack may also include a second layer of OCA and a dielectric layer (which may be made of PET or another suitable material, similar to the substrate with the conductive material forming the electrodes). As an alternative, a thin coating of a dielectric material may be applied instead of the second layer of OCA and the dielectric layer. The second layer of OCA may be disposed between the substrate with the conductive material making up the electrodes and the dielectric layer, and the dielectric layer may be disposed between the second layer of OCA and an air gap to a display of a device including touch sensor array 100 and touch sensor controller 102. For example, the cover panel may have a thickness of approximately 1 millimeter (mm); the first layer of OCA may have a thickness of approximately 0.05 mm; the substrate with the conductive material forming the electrodes may have a thickness of approximately 0.05 mm; the second layer of OCA may have a thickness of approximately 0.05 mm; and the dielectric layer may have a thickness of approximately 0.05 mm.

Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. For example, in certain embodiments, a layer of adhesive or dielectric may replace the dielectric layer, second layer of OCA, and air gap described above, with there being no air gap in the display.

One or more portions of the substrate of touch sensor array 100 may be made of polyethylene terephthalate (PET) or another suitable material. This disclosure contemplates any suitable substrate with any suitable portions made of any suitable material. In certain embodiments, one or more electrodes in touch sensor array 100 are made of ITO in whole or in part. Additionally or alternatively, one or more electrodes in touch sensor array 100 are made of fine lines of metal or other conductive material. For example, one or more portions of the conductive material may be copper or copper-based and have a thickness of approximately 5 microns (μm) or less and a width of approximately 10 μm or less. As another example, one or more portions of the conductive material may be silver or silver-based and similarly have a thickness of approximately 5 μm or less and a width of approximately 10 μm or less. This disclosure contemplates any suitable electrodes made of any suitable material.

In certain embodiments, touch sensor array 100 implements a capacitive form of touch sensing. This may include both mutual- and self-capacitance implementations. In a mutual-capacitance implementation, touch sensor array 100 may include an array of drive and sense electrodes forming an array of capacitive nodes. A drive electrode and a sense electrode may form a capacitive node. The drive and sense electrodes forming the capacitive node are positioned near each other but do not make electrical contact with each other. Instead, in response to a signal being applied to the drive electrodes for example, the drive and sense electrodes capacitively couple to each other across a space between them. A pulsed or alternating voltage applied to the drive electrode (by touch sensor controller 102) induces a charge on the sense electrode, and the amount of charge induced is susceptible to external influence (such as a touch or the proximity of an object). When an object touches or comes within proximity of the capacitive node, a change in capacitance may occur at the capacitive node and touch sensor controller 102 measures the change in capacitance. By measuring changes in capacitance throughout the array, touch sensor controller 102 determines the position of the touch or proximity within touch-sensitive areas of touch sensor array 100.

In a self-capacitance implementation, touch sensor array 100 may include an array of electrodes of a single type that may each form a capacitive node. When an object touches or comes within proximity of the capacitive node, a change in self-capacitance may occur at the capacitive node and touch sensor controller 102 measures the change in capacitance, for example, as a change in the amount of charge implemented to raise the voltage at the capacitive node by a pre-determined amount. As with a mutual-capacitance implementation, by measuring changes in capacitance throughout the array, touch sensor controller 102 determines the position of the touch or proximity within touch-sensitive areas of touch sensor array 100. This disclosure contemplates any suitable form of capacitive touch sensing.

In certain embodiments, one or more drive electrodes together form a drive line running horizontally or vertically or in any suitable orientation. Similarly, in certain embodiments, one or more sense electrodes together form a sense line running horizontally or vertically or in any suitable orientation. As one particular example, drive lines run substantially perpendicular to the sense lines. Reference to a drive line may encompass one or more drive electrodes making up the drive line, and vice versa. Reference to a sense line may encompass one or more sense electrodes making up the sense line, and vice versa.

In certain embodiments, touch sensor array 100 includes drive and sense electrodes disposed in a pattern on one side of a single substrate. In such a configuration, a pair of drive and sense electrodes capacitively coupled to each other across a space between them form a capacitive node. As an example self-capacitance implementation, electrodes of a single type are disposed in a pattern on a single substrate. In addition or as an alternative to having drive and sense electrodes disposed in a pattern on one side of a single substrate, touch sensor array 100 may have drive electrodes disposed in a pattern on one side of a substrate and sense electrodes disposed in a pattern on another side of the substrate. Moreover, touch sensor array 100 may have drive electrodes disposed in a pattern on one side of one substrate and sense electrodes disposed in a pattern on one side of another substrate. In such configurations, an intersection of a drive electrode and a sense electrode forms a capacitive node. Such an intersection may be a position where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor array 100 may indicate a touch or proximity input at the position of the capacitive node. Touch sensor controller 102 detects and processes the change in capacitance to determine the presence and position of the touch or proximity input. In certain embodiments, touch sensor controller 102 then communicates information about the touch or proximity input to one or more other components (such as one or more central processing units (CPUs)) of a touch-sensitive device that includes touch sensor array 100 and touch sensor controller 102, which may respond to the touch or proximity input by initiating a function of the device (or an application running on the device). Although this disclosure describes a particular touch sensor controller having particular functionality with respect to a particular device and a particular touch sensor, this disclosure contemplates any suitable touch sensor controller having any suitable functionality with respect to any suitable device and any suitable touch sensor.

In certain embodiments, touch sensor controller 102 is implemented as one or more integrated circuits (ICs), such as for example general-purpose microprocessors, microcontrollers, programmable logic devices or arrays, application-specific ICs (ASICs). Touch sensor controller 102 comprises any suitable combination of analog circuitry, digital logic, and digital non-volatile memory. In particular embodiments, touch sensor controller 102 may comprise instructions stored in a computer-readable medium (e.g., one or more memory units), wherein the instructions are configured, when executed by one or more processors of touch sensor controller 102, to perform one or more functions or steps of a method. In certain embodiments, touch sensor controller 102 is disposed on a flexible printed circuit (FPC) bonded to the substrate of touch sensor array 100, as described below. The FPC may be active or passive. In certain embodiments, multiple touch sensor controllers 102 are disposed on the FPC.

In an example implementation, touch sensor controller 102 includes a processor unit, a drive unit, a sense unit, and a storage unit. In such an implementation, the drive unit supplies drive signals to the drive electrodes of touch sensor array 100, and the sense unit senses charge at the capacitive nodes of touch sensor array 100 and provides measurement signals to the processor unit representing capacitances at the capacitive nodes. The processor unit controls the supply of drive signals to the drive electrodes by the drive unit and process measurement signals from the sense unit to detect and process the presence and position of a touch or proximity input within touch-sensitive areas of touch sensor array 100. The processor unit may also track changes in the position of a touch or proximity input within touch-sensitive areas of touch sensor array 100. The storage unit stores programming for execution by the processor unit, including programming for controlling the drive unit to supply drive signals to the drive electrodes, programming for processing measurement signals from the sense unit, and other suitable programming. Although this disclosure describes a particular touch sensor controller having a particular implementation with particular components, this disclosure contemplates any suitable touch sensor controller having any suitable implementation with any suitable components.

Tracks 104 of conductive material disposed on the substrate of touch sensor array 100 couple the drive or sense electrodes of touch sensor array 100 to connection pads 106, also disposed on the substrate of touch sensor array 100. As described below, connection pads 106 facilitate coupling of tracks 104 to touch sensor controller 102. Tracks 104 may extend into or around (e.g., at the edges of) touch-sensitive areas of touch sensor array 100. In certain embodiments, particular tracks 104 provide drive connections for coupling touch sensor controller 102 to drive electrodes of touch sensor array 100, through which the drive unit of touch sensor controller 102 supplies drive signals to the drive electrodes, and other tracks 104 provide sense connections for coupling touch sensor controller 102 to sense electrodes of touch sensor array 100, through which the sense unit of touch sensor controller 102 senses charge at the capacitive nodes of touch sensor array 100.

Tracks 104 are be made of fine lines of metal or other conductive material. For example, the conductive material of tracks 104 may be copper or copper-based and have a width of approximately 100 μm or less. As another example, the conductive material of tracks 104 may be silver or silver-based and have a width of approximately 100 μm or less. In certain embodiments, tracks 104 are made of ITO in whole or in part in addition or as an alternative to the fine lines of metal or other conductive material. Although this disclosure describes particular tracks made of particular materials with particular widths, this disclosure contemplates any suitable tracks made of any suitable materials with any suitable widths. In addition to tracks 104, touch sensor array 100 may include one or more ground lines terminating at a ground connector (which may be a connection pad 106) at an edge of the substrate of touch sensor array 100 (similar to tracks 104).

Connection pads 106 may be located along one or more edges of the substrate, outside touch-sensitive areas of touch sensor array 100. As described above, touch sensor controller 102 may be on an FPC. Connection pads 106 may be made of the same material as tracks 104 and may be bonded to the FPC using an anisotropic conductive film (ACF). In certain embodiments, connection 108 include conductive lines on the FPC coupling touch sensor controller 102 to connection pads 106, in turn coupling touch sensor controller 102 to tracks 104 and to the drive or sense electrodes of touch sensor array 100. In another embodiment, connection pads 106 are connected to an electro-mechanical connector (such as a zero insertion force wire-to-board connector); in this embodiment, connection 108 may not include an FPC, if desired. This disclosure contemplates any suitable connection 108 between touch sensor controller 102 and touch sensor array 100.

Figure 2A:
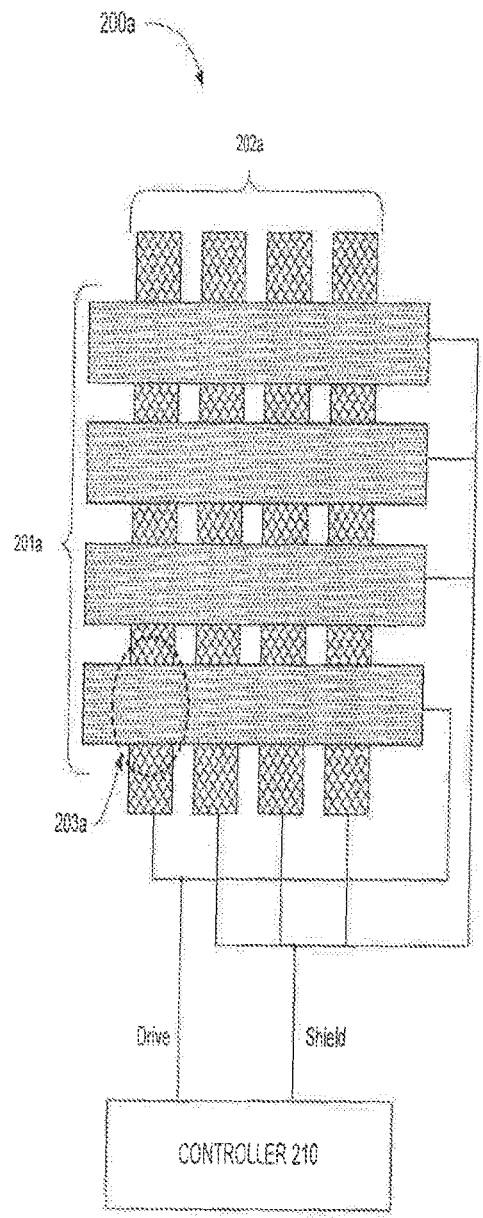
FIGS. 2A-2B illustrate example touch sensor arrays operating in a self-capacitive mode of operation according to certain embodiments of the present disclosure.
Figure 2B:
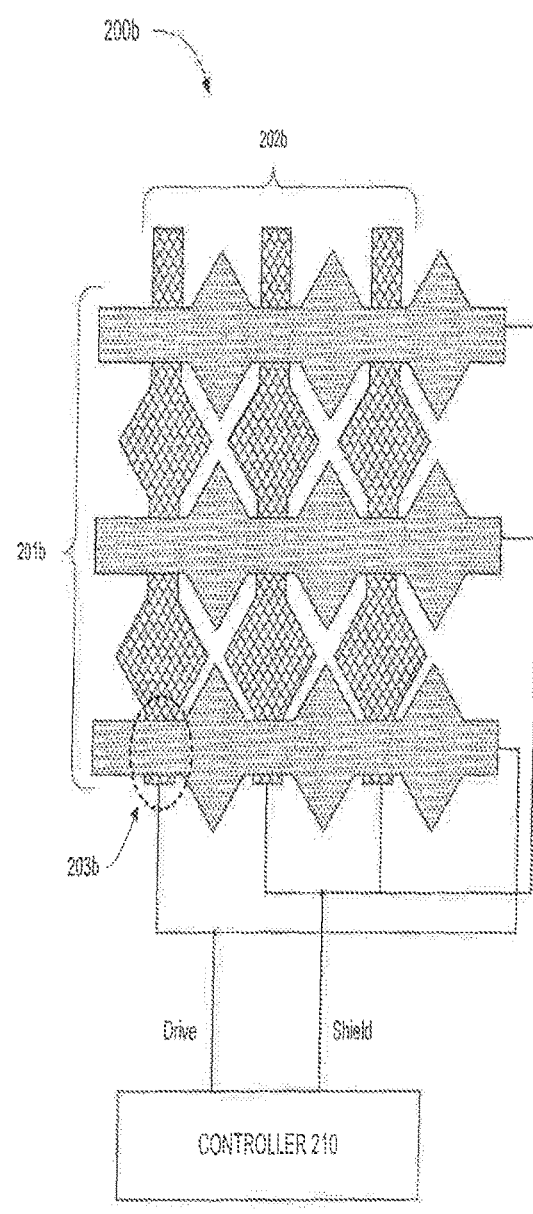

FIGS. 2A-2B illustrate example touch sensor arrays 200 operating in a self-capacitive mode of operation according to certain embodiments of the present disclosure. Array 200a of FIG. 2A comprises electrodes in a grid pattern, while array 200b of FIG. 2B comprises electrodes in a diamond pattern. Each of arrays 200 comprises x-axis electrodes 201 and y-axis electrodes 202, wherein the x-axis electrodes 201 and y-axis electrodes 202 overlap to form a plurality of capacitive nodes (e.g., capacitive node 203).

In self-capacitive modes of operation, both sets of electrodes (e.g., both x-axis electrodes 201 and y-axis electrodes 202) are driven to create a self-capacitance in the capacitive nodes formed thereby (e.g., capacitive node 203). When an object touches or comes within proximity of the capacitive node, a change in self-capacitance may occur at the capacitive node and a touch sensor controller coupled to the array measures the change in capacitance, for example, as a change in the amount of charge implemented to raise the voltage at the capacitive node by a pre-determined amount. By measuring changes in capacitance throughout the array, the touch sensor controller determines the position of the touch or proximity within touch-sensitive areas of the touch sensor.

Figure 4A:
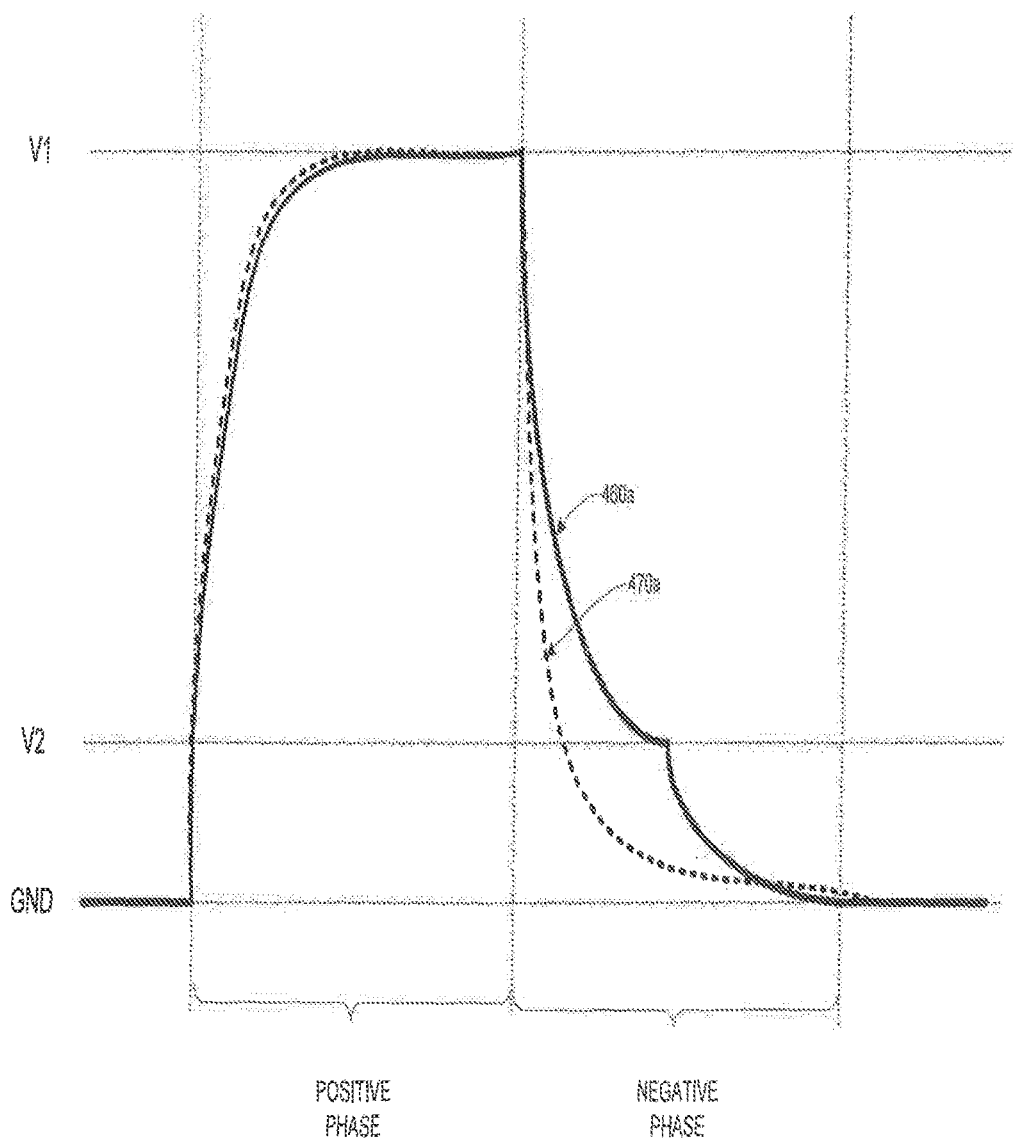
FIGS. 4A-4B illustrate example electrode voltage waveforms according to certain embodiments of the present disclosure.

In some embodiments, only a portion of the x-axis electrodes and y-axis electrodes may be driven and measured for touch input. For instance, as illustrated in FIGS. 2A-2B, only the electrodes forming capacitive node 203 may be driven and measured for touch input. If the non-measured electrodes are left floating in these embodiments (i.e., with no applied drive signal or voltage), interactions may take place between measured and non-measured electrodes due to the mutual capacitance present between the respective electrodes. Accordingly, a driven shield signal may be applied to the non-measured electrodes as illustrated, which may cancel one or more effects caused by the mutual capacitance present between the measured and non-measured electrodes. In certain embodiments, the driven shield signal may be a substantially similar waveform to the drive signal applied to the measured x-axis electrodes and y-axis electrodes of the touch sensor, which may be a pulsed or alternating signal. In other embodiments, the driven shield signal may be different from the drive signal applied to the measured electrodes, but both signals may still alternate between the same high and low reference voltages. An example driven shield signal waveform and associated drive signal waveform are illustrated in FIG. 4A and discussed further below.

Although described above in particular patterns, the electrodes of touch sensors according to the present disclosure may be in any appropriate pattern. In certain embodiments, for example, x-axis electrodes 201 may not be exactly horizontal and y-axis electrodes 202 may not be exactly vertical. Rather, x-axis electrodes 201 may be any appropriate angle to horizontal and y-axis electrodes 202 may be any appropriate angle to vertical. This disclosure is not limited to the configurations of x-axis electrodes and y-axis electrodes illustrated in FIGS. 2A-2B. Instead, this disclosure anticipates any appropriate pattern, configuration, design, or arrangement of electrodes and is not limited to the example patterns discussed above.

Figure 3:
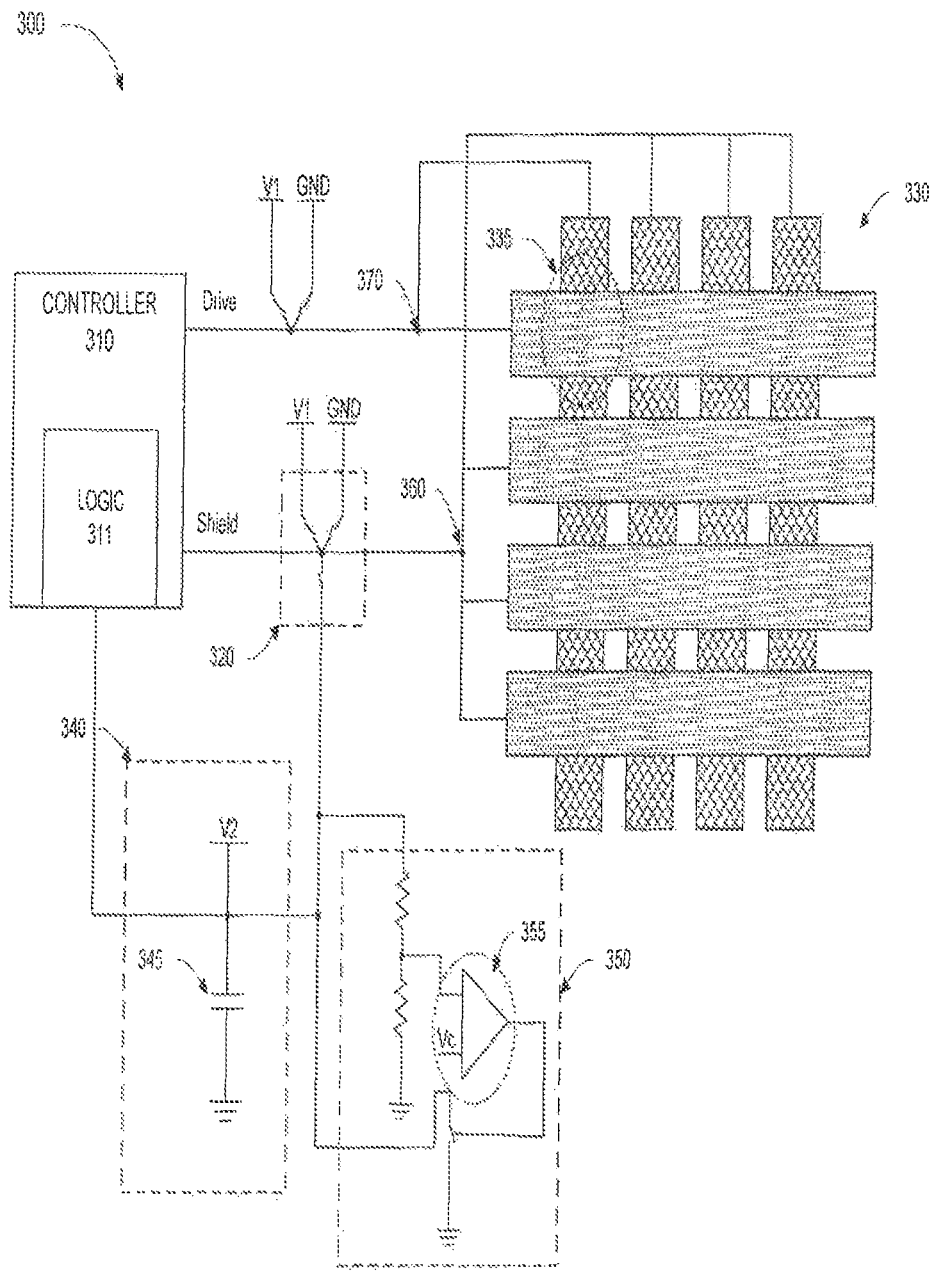
FIG. 3 illustrates an example self-capacitive touch sensor array with a charge capture and re-use system according to certain embodiments of the present disclosure.

FIG. 3 illustrates an example system 300 for capturing and re-using charge according to certain embodiments of the present disclosure. In particular, FIG. 3 illustrates an example touch sensor controller 310 coupled to switch 320 and touch sensor array 330. Switch 320 is further coupled to a charge capture and re-use system 340 that includes a capacitor 345. The charge capture and re-use system 340 is coupled to bleeder circuit 350. Although illustrated as being external to touch sensor controller 310 in FIG. 3, in certain embodiments, switch 320 and bleeder circuit 350 may be inside controller 310.

While operating in a self-capacitive mode of operation, touch sensor array 330 may be driven similar to arrays 200 of FIGS. 2A-2B. That is, particular electrodes of array 330 are connected to a drive signal (to detect touch inputs at capacitive node 335 of array 330) while others are connected to a driven shield signal (in order to avoid the issues described above with regard to leaving such electrodes floating). The driven shield signal may closely replicate the drive signal in particular embodiments, such that the driven shield signal is substantially similar to the drive signal. An example drive signal waveform 470a and an example driven shield signal waveform 460a according to particular embodiments of the present disclosure are illustrated in FIG. 4A and described further below.

The drive signals applied to the measured electrodes may be pulsed in particular embodiments. That is, the measured electrodes may be connected to one or more voltages that cause the electrodes to vary between a high reference voltage (represented by V1 in FIG. 3) such as 9 V and ground at a particular frequency (e.g., 75 kHz). Because the driven shield signal applied to the non-measured electrodes may be substantially similar to the pulsed drive signal applied to the measured electrodes, a large amount of current and power is wasted by pulsing the non-measured electrodes between the high reference voltage and ground. This is especially true in current touch sensor designs with high capacitive loads (e.g., between 15 nF and 25 nF).

Accordingly, rather than connecting the non-measured electrodes to ground immediately after the high reference voltage during such pulsing, particular embodiments of the present disclosure connect the non-measured electrodes to capacitor 345 which is coupled to a reference voltage that is between the high reference voltage of the pulse signal and ground, such as 1.33 V (represented by V2 in FIG. 3), for a short period of time prior to connecting the electrodes to ground. The capacitor may have a capacitance of approximately 1 µF to 10 µF in certain embodiments. By connecting the non-measured electrodes of array 330 to capacitor 345 in this way, capacitor 345 may store much of the charge that would have otherwise been discharged to ground. After capacitor 345 has collected charge from the non-measured electrodes of array 330, the non-measured electrodes may then be connected to ground in order to mimic the pulsed signal of the measured electrodes. Example waveforms 460 and 470 of FIGS. 4A-4B illustrate example voltage waveforms at points 360 and 370 of FIG. 3, respectively.

The charge stored in capacitor 345 may be re-used. For example, in some embodiments, the charge in capacitor 345 may be used to power digital logic circuits 311 (e.g., may be sent to a power supply or supply voltage rail) in the touch sensor controller 310. The charge stored in capacitor 345 may also be used to power other electronic components of a touch-sensitive device in some embodiments. In certain situations, the amount of charge captured by capacitor 345 may be larger than what may in turn be used by logic 311 or other components. To avoid a rise in the reference drive voltage of logic 311 caused by the excess charge in capacitor 345, a bleeder circuit 350 may be coupled to capacitor 345 such that the excess charge may be discharged appropriately without causing a rise in the reference drive voltage of logic 311.

Bleeder circuit 350 may comprise a comparator circuit 355 that monitors the voltage on the reference voltage V2 coupled to capacitor 345. If the voltage V2 raises above a particular threshold, then comparator circuit 355 of bleeder circuit 350 may connect capacitor 345 to ground (e.g, via a switch as illustrated) in order to discharge the excess charge stored in capacitor 345 and avoid an increase in reference voltage V2. The threshold used by comparator circuit 355 may be based on another reference voltage supplied to the comparator circuit, such as Vc as illustrated in FIG. 3.

Figure 4B:
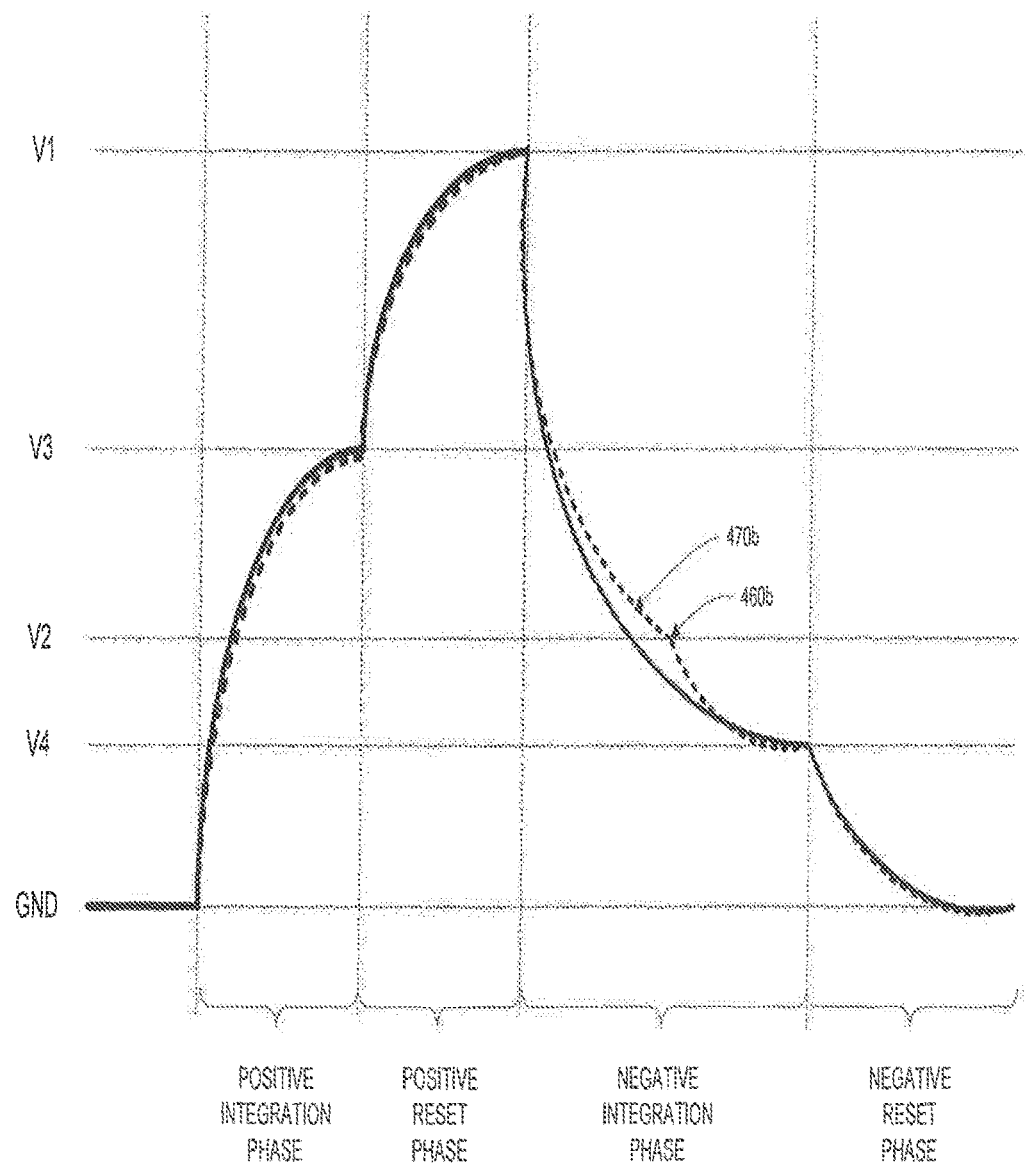

FIGS. 4A-4B illustrate example electrode voltage waveforms 460 and 470 according to certain embodiments of the present disclosure. Waveforms 460 of FIGS. 4A-4B may represent voltages applied to electrodes coupled to a capacitor in order to capture charge lost during the transition from the high reference voltage V1 to ground, while waveforms 470 of FIGS. 4A-4B may represent voltages typically applied to electrodes that do not incorporate the teachings of the present disclosure. As the voltage applied to the electrode transitions from V1 to ground in waveforms 470, for instance, the charge in the electrode may be effectively wasted. According to aspects of the present disclosure, however, the electrode may be connected to an intermediate voltage (e.g., voltage V2 of FIG. 4A as shown in waveform 460a) to which a capacitor is coupled prior to connecting the electrode to ground. By doing so, most of the charge that would otherwise be lost may be captured by the capacitor, and stored for later use (e.g., by other circuits coupled to the capacitor). Waveforms 460 may thus allow for charge capture and re-use while appearing substantially similar to waveforms 470.

In certain embodiments, waveforms 460 and 470 may represent voltages at points 360 and 370, respectively, of system 300 of FIG. 3 in certain embodiments. Referring to FIG. 4A, waveform 460a may comprise two phases according to certain embodiments of the present disclosure, which may include a positive phase and a negative phase. The positive phase may generally refer to the phase of bringing the electrodes of a self-capacitive touch sensor 330 from ground to a high reference drive voltage V1 (e.g., 9 V), while the negative phase may generally refer to the phase of bringing the electrodes from the high reference drive voltage V1 (e.g., 9 V) to ground. Although illustrated as alternating between high reference voltage V1 and ground, certain embodiments may alternate the measured and non-measured electrodes of a touch sensor between high reference voltage V1 and any particular reference voltage below V1.

During the positive phase, both the measured and the non-measured electrodes may be connected to the high drive reference voltage V1. During the negative phase, the non-measured electrodes may be connected to a capacitor coupled to a low reference voltage V2 first (while the measured electrodes are connected to ground). Typically, during the negative phase, the non-measured electrodes would be connected to ground after being connected to V2 as well to quickly reduce the voltage thereon and mimic the signal on the measured electrodes. However, as described above, connecting the non-measured electrodes to the voltage V2 may allow the capacitor coupled thereto to capture and re-use of the charge in the non-measured electrodes.

Although illustrated as particular waveforms, the waveforms on the measured and non-measured electrodes may be different from those depicted in FIG. 4A. As one example, the measured and non-measured electrodes may be driven to intermediate voltages between the high reference voltage V1 and ground in the positive and negative phases. For instance, as illustrated in FIG. 4B, each of the positive phase and the negative phase may include an integration phase and a reset phase. During the positive integration phase, both the non-measured and measured electrodes may be connected to a intermediate reference voltage V3 that is between ground and the high drive reference voltage V1, and during the positive reset phase, both the non-measured and measured electrodes may be connected to the high drive reference voltage V1. During the negative integration phase, the non-measured electrodes may be connected to a capacitor coupled to reference voltage V2 first before being connected to intermediate reference voltage V4 (as' shown in waveform 460b) while the measured electrodes are connected to V4 (as shown in waveform 470b). During the negative reset phase, both the measured and non-measured electrodes may be connected to ground.

Figure 5:
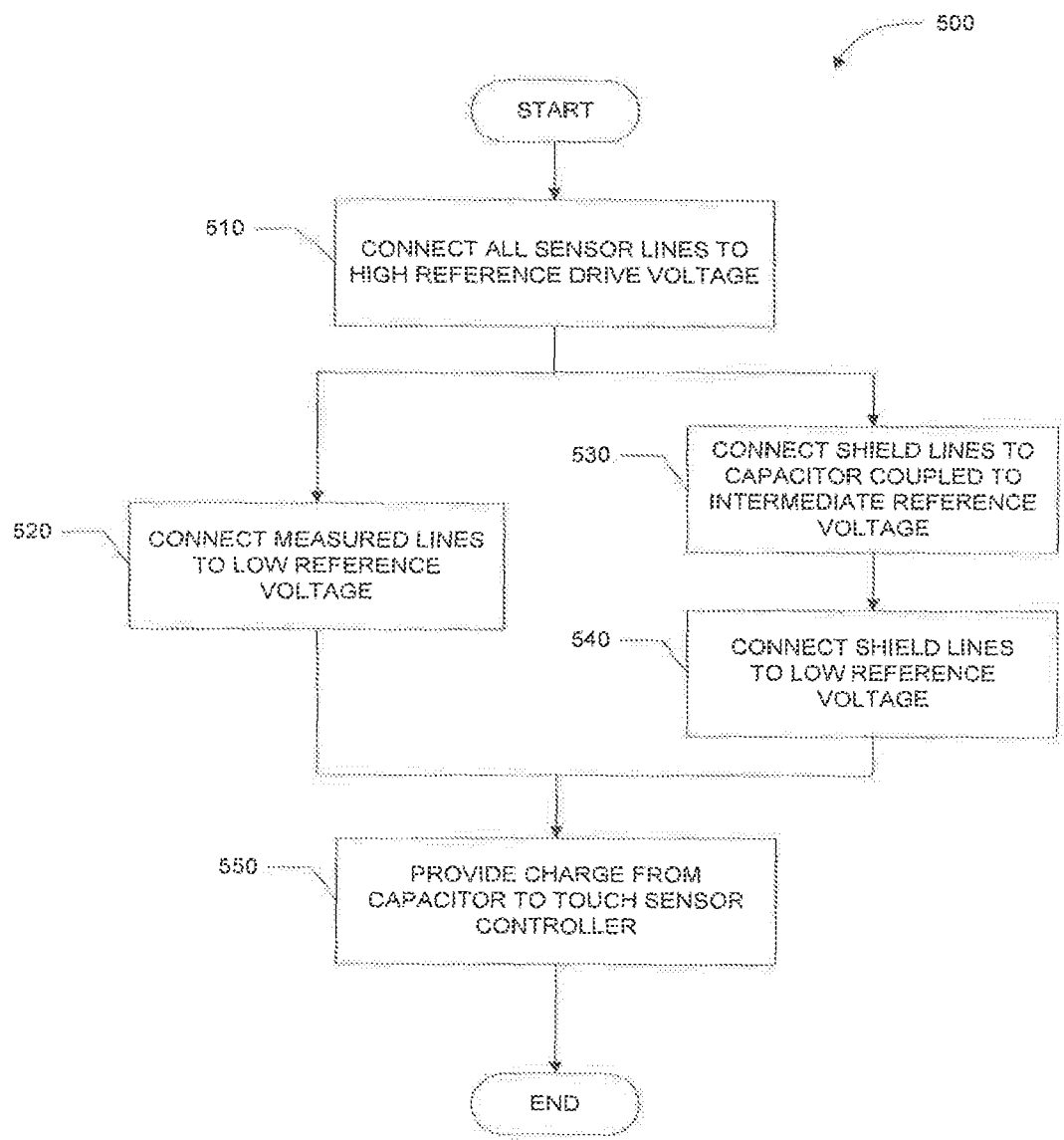
FIG. 5 illustrates an example method for charge capture and re-use in self-capacitive touch sensors according to certain embodiments of the present disclosure.

FIG. 5 illustrates an example method 500 for charge capture and re-use in self-capacitive touch sensors according to certain embodiments of the present disclosure. Method 500 may be performed by logic (e.g., hardware or software) of a touch sensor controller. For example, method 500 may be performed by executing (with one or more processors of the touch sensor controller) instructions stored in a computer-readable medium of the touch sensor controller.

The method begins at step 510, where each of a plurality of electrodes arranged to form an array of capacitive sensing nodes is connected to a first reference voltage (e.g., 9 V). The plurality of electrodes may include a first portion (e.g., measured electrodes) and a second portion (e.g., non-measured electrodes) of a capacitive touch sensor array operating in a self-capacitive mode of operation. Example waveforms depicting the voltages of the first portion (e.g., measured electrodes) and the second portion (e.g., non-measured electrodes) during step 510 are illustrated in the positive phase of FIG. 4A as waveforms 470a and 460a, respectively. The first reference voltage may be a high reference drive voltage of a pulsed drive signal. In some embodiments, this step may include connecting both the first portion (e.g., the measured electrodes) and the second portion (e.g., the non-measured electrodes) of the plurality of electrodes to a reference voltage lower than the first reference voltage prior to connecting the first portion and the second portion of the plurality of electrodes to the first reference voltage (see, e.g., the positive integration and positive reset phases illustrated in FIG. 4B).

At step 520, the first portion of the plurality of electrodes (e.g., the measured electrodes) is connected to a second reference voltage lower than the first reference voltage of step 510. In some embodiments, the second reference voltage may be ground. While the first portion of the plurality of electrodes is connected to the second reference voltage, the second portion of the plurality of electrodes (e.g., the non-measured electrodes) are connected at step 530 to a capacitor coupled to a third reference voltage that is lower than the first reference voltage and above the second reference voltage (e.g., 1.33 V), and then connected to the second reference voltage at step 540.

At step 550, charge from the capacitor is re-used and provided to the touch sensor controller coupled to the array of capacitive sensing nodes. The charge may be provided to any suitable component of the touch sensor controller, such as the digital logic circuits of the touch sensor controller. For example, in certain embodiments, the charge provided to the touch sensor controller may provided power to the digital logic circuits of the controller. Excess charge stored in the capacitor may be discharged, such as through the use of a bleeder circuit that includes a comparator circuit, as described above.

Modifications, additions, or omissions may be made to method 500 without departing from the scope of the present disclosure. For example, although described in steps 520 and 540 as connecting the sensor lines to ground, the sensor lines may be connected to a reference voltage between the low reference voltage of step 530 and ground in certain embodiments. As another example, although illustrated as separate steps, step 550 may be performed at the same time as steps 510-540 are being performed (e.g., captured charge is continuously supplied to the touch sensor controller while the sensor lines are driven according to steps 510-540). Furthermore, the order of the steps may be performed in a different manner than that described and some steps may be performed at the same time. Additionally, each individual step may include additional steps without departing from the scope of the present disclosure.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses a myriad of changes, substitutions, variations, alterations, and modifications to the example embodiments herein that a person having ordinary skill in the art would comprehend. Similarly, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:
1. An apparatus, comprising:
a first electrode;
one or more processors; and one or more memory units coupled to the one or more processors, the one or more memory units collectively storing logic configured, when executed by the one or more processors, to cause the one or more processors to control connections of the first electrode by:
connecting the first electrode to a first reference voltage;
after connecting the first electrode to the first reference voltage, connecting the first electrode to a second reference voltage, wherein a capacitor is coupled to the second reference voltage and the second reference voltage is lower than the first reference voltage;
after connecting the first electrode to the second reference voltage, connecting the first electrode to a third reference voltage, wherein the third reference voltage is lower than the first reference voltage and the second reference voltage;
connecting the first electrode to a fourth reference voltage prior to connecting the first electrode to the first reference voltage, wherein the fourth reference voltage is lower than the first reference voltage and higher than the third reference voltage; and
after connecting the first electrode to the second reference voltage and prior to connecting the first electrode to the third reference voltage, connecting the first electrode to a fifth reference voltage, wherein the fifth reference voltage is lower than the second reference voltage and higher than the third reference voltage.

2. The apparatus of claim 1, wherein the capacitor is coupled to a voltage supply of a circuit.

3. The apparatus of claim 1, wherein the capacitor is further coupled to a bleed circuit configured to discharge excess charge stored in the capacitor.

4. The apparatus of claim 3, wherein the bleed circuit comprises a comparator circuit.

5. The apparatus of claim 1, wherein the first electrode is an electrode of a capacitive touch sensor.

6. The apparatus of claim 1, further comprising a second electrode, wherein the logic is further configured, when executed by the one or more processors, to cause the one or more processors to control connections of the second electrode by:
connecting the second electrode to the first reference voltage while the first electrode is connected to the first reference voltage; and
connecting the second electrode to the third reference voltage while the first electrode is connected to the second reference voltage and then the third reference voltage.

7. The apparatus of claim 6, wherein the first electrode and the second electrode are electrodes of a capacitive touch sensor.

8. The apparatus of claim 1 further comprising a second electrode, wherein the logic is further configured, when executed by the one or more processors, to cause the one or more processors to control connections of the second electrode by:
connecting the second electrode to the fourth reference while the first electrode is connected to the fourth reference voltage; and
connecting the second electrode to the fifth reference voltage while the first electrode is connected to the second reference voltage and then the fifth reference voltage.

9. The apparatus of claim 8, wherein the first electrode and the second electrode are electrodes of a capacitive touch sensor.

10. A method, comprising:
connecting a first electrode to a first reference voltage;
after connecting the first electrode to the first reference voltage, connecting the first electrode to a second reference voltage, wherein a capacitor is coupled to the second reference voltage and the second reference voltage is lower than the first reference voltage;
after connecting the first electrode to the second reference voltage, connecting the first electrode to a third reference voltage, wherein the third reference voltage is lower than the first reference voltage and the second reference voltage;
connecting the first electrode to a fourth reference voltage prior to connecting the first electrode to the first reference voltage, wherein the fourth reference voltage is lower than the first reference voltage and higher than the third reference voltage; and
after connecting the first electrode to the second reference voltage and prior to connecting the first electrode to the third reference voltage, connecting the first electrode to a fifth reference voltage, wherein the fifth reference voltage is lower than the second reference voltage and higher than the third reference voltage.

11. The method of claim 10, further comprising providing charge from the capacitor to a voltage supply of a circuit.

12. The method of claim 10, further comprising discharging excess charge stored in the capacitor to a bleed circuit.

13. The method of claim 10, further comprising:
connecting a second electrode to the first reference voltage while the first electrode is connected to the first reference voltage; and
connecting the second electrode to the third reference voltage while the first electrode is connected to the second reference voltage and then the third reference voltage.

14. The method of claim 10, further comprising:
connecting a second electrode to the fourth reference while the first electrode is connected to the fourth reference voltage; and
connecting the second electrode to the fifth reference voltage while the first electrode is connected to the second reference voltage and then the fifth reference voltage.

15. A computer-readable non-transitory storage medium comprising logic that is configured, when executed, to:
connect a first electrode to a first reference voltage;
after connecting the first electrode to the first reference voltage, connect the first electrode to a second reference voltage, wherein a capacitor is coupled to the second reference voltage and the second reference voltage is lower than the first reference voltage;
after connecting the first electrode to the second reference voltage, connect the first electrode to a third reference voltage, wherein the third reference voltage is lower than the first reference voltage and the second reference voltage;
connect the first electrode to a fourth reference voltage prior to connecting the first electrode to the first reference voltage, wherein the fourth reference voltage is lower than the first reference voltage and higher than the third reference voltage; and
after connecting the first electrode to the second reference voltage and prior to connecting the first electrode to the third reference voltage, connect the first electrode to a fifth reference voltage, wherein the fifth reference voltage is lower than the second reference voltage and higher than the third reference voltage.

16. The computer-readable non-transitory storage medium of claim 15, wherein the logic is further configured, when executed, to provide charge from the capacitor to a voltage supply of a circuit.

17. The computer-readable non-transitory storage medium of claim 15, wherein the logic is further configured, when executed, to discharge excess charge stored in the capacitor to a bleed circuit.

18. The computer-readable non-transitory storage medium of claim 15, wherein the logic is further configured, when executed, to:
connect a second electrode to the first reference voltage while the first electrode is connected to the first reference voltage; and
connect the second electrode to the third reference voltage while the first electrode is connected to the second reference voltage and then the third reference voltage.

19. The computer-readable non-transitory storage medium of claim 15, wherein the logic is further configured, when executed, to:
connect a second electrode to the fourth reference while the first electrode is connected to the fourth reference voltage; and
connect the second electrode to the fifth reference voltage while the first electrode is connected to the second reference voltage and then the fifth reference voltage.

20. A method, comprising:
connecting a first electrode to a first reference voltage;
after connecting the first electrode to the first reference voltage, connecting the first electrode to a second reference voltage, wherein a capacitor is coupled to the second reference voltage and the second reference voltage is lower than the first reference voltage;
after connecting the first electrode to the second reference voltage, connecting the first electrode to a third reference voltage, wherein the third reference voltage is lower than the first reference voltage and the second reference voltage; and
providing charge from the capacitor to a voltage supply of a circuit.

* * * * *